(12) United States Patent
Jackson et al.

(10) Patent No.: US 7,812,971 B2
(45) Date of Patent: Oct. 12, 2010

(54) MULTI COLOR AUTOFOCUS APPARATUS AND METHOD

(75) Inventors: Robert L. Jackson, Moorpark, CA (US); Edward T. Polidor, Webster, NY (US)

(73) Assignee: Quality Vision International, Inc., Rochester, NY (US)

( * ) Notice: Subject to any disclaimer, the term of this patent is extended or adjusted under 35 U.S.C. 154(b) by 650 days.

(21) Appl. No.: 11/770,187

(22) Filed: Jun. 28, 2007

(65) Prior Publication Data

US 2009/0003815 A1    Jan. 1, 2009

(51) Int. Cl.
  *G01B 11/14*    (2006.01)
(52) U.S. Cl. ....................... 356/614; 356/404
(58) Field of Classification Search ........... 356/404, 356/406, 609, 614, 624, 121, 123, 124, 402; 348/345
  See application file for complete search history.

(56) References Cited

U.S. PATENT DOCUMENTS

| | | | |
|---|---|---|---|
| 4,585,349 A * | 4/1986 | Gross et al. | ............... 356/624 |
| 5,790,242 A | 8/1998 | Stern et al. | |
| 6,580,502 B1 | 6/2003 | Kuwabara | |
| 6,674,572 B1 | 1/2004 | Scheruebl et al. | |
| 6,917,421 B1 | 7/2005 | Wihl et al. | |
| 7,030,351 B2 | 4/2006 | Wasserman et al. | |
| 7,369,225 B2 | 5/2008 | Messerschmidt et al. | |
| 2001/0028402 A1 | 10/2001 | Sugimoto | |
| 2005/0031184 A1 | 2/2005 | Davis et al. | |
| 2005/0109959 A1 | 5/2005 | Wasserman | |
| 2005/0206885 A1 | 9/2005 | Kurata | |
| 2006/0092313 A1 * | 5/2006 | Kimura | ...................... 348/345 |
| 2006/0158665 A1 | 7/2006 | Babayoff et al. | |
| 2006/0244950 A1 * | 11/2006 | Wegmann | ................... 356/124 |

FOREIGN PATENT DOCUMENTS

EP    1 238 244 B1    9/2005

OTHER PUBLICATIONS

International Search Report and Written Opinion for corresponding International Application No. PCT/US2008/068483.

* cited by examiner

*Primary Examiner*—Tarifur Chowdhury
*Assistant Examiner*—Tara S Pajoohi
(74) *Attorney, Agent, or Firm*—Harter Secrest & Emery LLP; Stephen B. Salai; Brian B. Shaw (57) ABSTRACT

An autofocus system and method that includes a controllable light source having at least two selectively activated substantially monochromatic output wavelengths adapted for illuminating an object; a camera receiving light from said light source reflected from a portion of said object and generating output signals responsive to said received light; a controller connected to said camera and said controllable light source for positioning said camera and sequentially illuminating a first portion of the object with at least two selectively activated substantially monochromatic output wavelengths, moving the camera to a second position and sequentially illuminating a second portion of the object with at least two selectively activated substantially monochromatic output wavelengths; and a data processor connected to said camera and receiving said output signals and for each portion, comparing the output signals associated with each wavelength and determining a focus parameter from said comparison.

27 Claims, 6 Drawing Sheets

MULTI COLOR AUTOFOCUS APPARATUS AND METHOD

CROSS-REFERENCE TO RELATED APPLICATIONS none

STATEMENT REGARDING FEDERALLY SPONSORED RESEARCH OR DEVELOPMENT none

THE NAMES OF THE PARTIES TO A JOINT RESEARCH AGREEMENT none

INCORPORATION-BY-REFERENCE OF MATERIAL SUBMITTED ON A COMPACT DISC none

BACKGROUND OF THE INVENTION

1. Field of the Invention

This invention relates generally to image acquisition for automated systems and more particularly to an improved autofocus method and apparatus for such systems using a sequential multicolored illuminator.

2. Description of Related Art Including Information Disclosed under 37 CFR 1.97 and 1.98

Image acquisition systems commonly employ autofocus techniques to improve their effectiveness. A number of techniques has been employed in the past and while some of these have been effective to some extent, there is a need for improved apparatus and methods for autofocusing. While autofocusing systems and methods of the type described can be used to determine a focus position for a camera, they can also be used to measure surface features.

Known systems conventionally employ top illumination to allow a camera to determine the peak contrast in a surface area during an auto focus sweep along an axis having a component perpendicular to the plane of the object, the Z-axis. The illumination may be created with light emitting diodes including colored light emitting diodes. Colored light emitting diodes are known to enhance the features of an object's surface because some features appear differently to a camera when using different colors for surface light.

One known system analyzes small patches or tiles of pixels covering the entire video field of view (FOV). The system determines the focus Z-height, that is, the height perpendicular to the object, at which the object is in focus for each tile at the point in each tile at which the contrast is maximum for that tile. The map of the maximum contrast Z heights at all locations in the field of view describes the topology of the surface. This data can be analyzed to give the shape of a cross-section anywhere on the surface, or to provide a focus height.

Another system also uses contrast information to determine the location of the maximum Z-height in a tile and find the section shape of the area of objects. This system can link to the Z-height data from several field of view data sets from a number of auto focus sweeps together to analyze the form of object surfaces larger than one field of view.

These known systems produce data with accuracy that depends on the characteristics of the surface being examined. When a tile size is small, for example 4×4 pixels, to obtain dense Z-height data from a surface, the structure of the surface can cause the data to become unreliable due in part to inherent camera noise and the surface reflectivity variation from tile to tile.

BRIEF SUMMARY OF THE INVENTION

In accordance with one aspect of this invention an improved autofocus system and method includes a controllable light source having at least two selectively activated substantially monochromatic output wavelengths adapted for illuminating an object; a camera receiving light from said light source reflected from a portion of said object and generating output signals responsive to said received light; a controller connected to said camera and said controllable light source for positioning said camera at a first Z-axis position and sequentially illuminating a portion of the object with each of the at least two selectively activated substantially monochromatic output wavelengths and acquiring contrast information output signals, moving the camera to a second Z-axis position and sequentially illuminating the portion of the object with each of the at least two selectively activated substantially monochromatic output wavelengths and acquiring contrast information output signals; and a data processor connected to said camera and receiving said contrast output signals and comparing the output signals associated with each wavelength and determining a focus parameter from said comparison.

It should be understood that as long as signals are acquired from more than one light source at each position, the precise order of light sources and positions may be varied from that described. For example, in accordance with the invention a first light source of the first wavelength could be activated at a first position, a second light source at a second wavelength activated at the second position and so on until all the light sources have been used. The order of light sources could then be repeated at the subsequent positions until signals from at least two light sources had been obtained at substantially all of the various z-axis positions. It is the acquisition of signals from light sources of more than one wavelength at each position that provides improved accuracy, not any specific order of illumination or position.

In accordance with another aspect of this invention each output signal comprises a gradient signal which is a function of the focus parameter for that position.

In accordance with another aspect of this invention the focus parameter is a height parameter.

In accordance with another aspect of this invention the output signal for each Z-axis position comprises a known wavelength dependant portion and a position dependant portion.

In accordance with another aspect of this invention the data processor determines an average height based on the wavelength dependant portion and the position dependant portion for the at least two wavelengths.

In accordance with another aspect of this invention the data processor determines a weighted average height based on the wavelength dependant portion and the position dependant portion for the at least two wavelengths.

In accordance with another aspect of this invention the data processor determines an average height based on the wavelength dependant portion and the position dependant portion for the at least two wavelengths and disregards any output signal if the difference between the wavelength dependant portion and the position dependant portion for the at least two wavelengths is more than a predetermined amount.

BRIEF DESCRIPTION OF THE SEVERAL VIEWS OF THE DRAWING(S)

FIGS. 2a-e are a timing diagram illustrating the sequence of operation of the various elements of the invention;

DETAILED DESCRIPTION OF THE INVENTION

Figure 1:
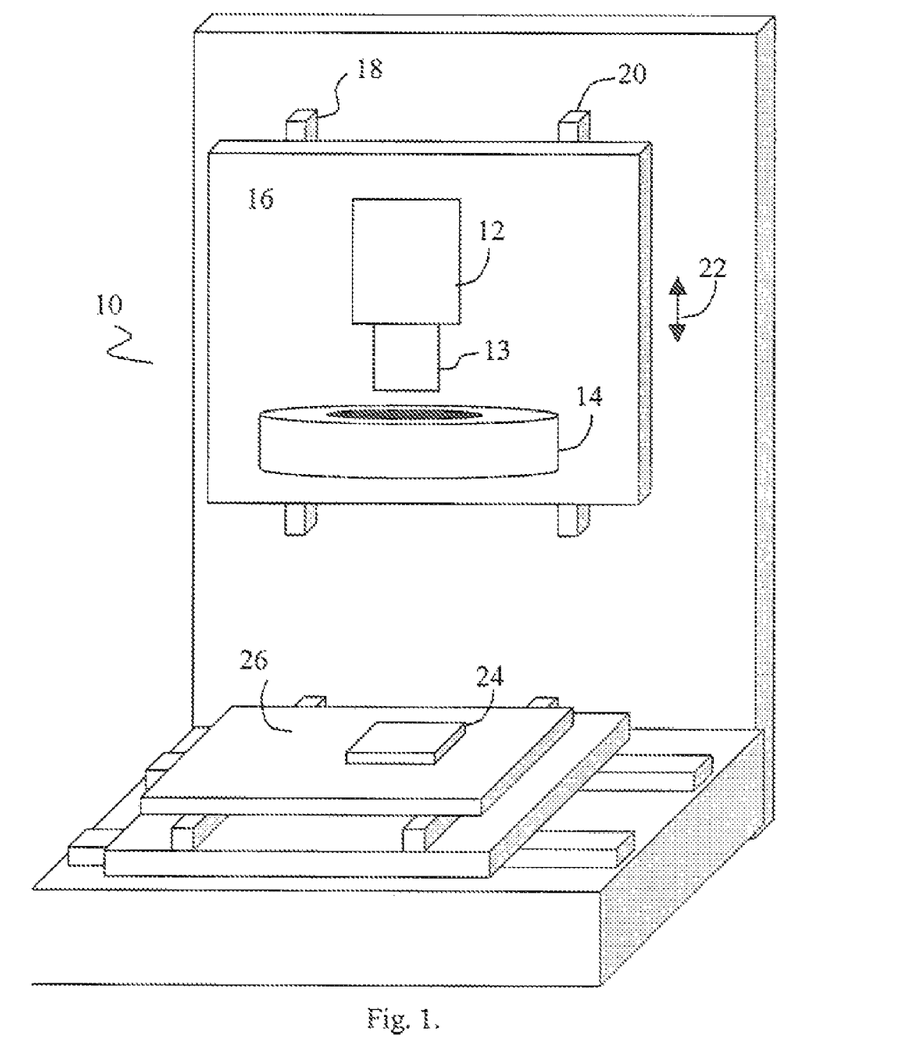
FIG. 1 is a diagrammatic view of a machine vision system implementing the autofocus apparatus and method of this invention.

Referring now to FIG. 1, a machine vision system indicated generally at 10 includes a camera 12 and a ring light 14 mounted on a platform 16 which is moveable along the Z-axis on slides 18 and 20 as shown by arrow 22. Ring light 14 preferably has a central aperture through which images are acquired, surrounded by a multiplicity of LED's of different colors not visible. Ring light 14 includes an illumination source having selectively actuable, essentially monochromatic illuminators such as a plurality of LED's for sequentially illuminating an object 24 with monochromatic light sources of different wavelengths and, for making an autofocus scan along the Z-axis 22 to determine the position of maximum contrast for each wavelength and by combining them thereby to determine the position of the best focus. While the invention is described in accordance with an embodiment in which the camera moves along the Z-axis with respect to a fixed (with respect to the Z-axis) object, either the camera, the object, or both may be moved to change the Z-axis spacing between them.

Those skilled in the art will understand that techniques for determining a focused position by maximizing contrast in an image are generally speaking known. A camera or other image acquisition device is directed to an area of interest within the field of view of the image acquisition device and the camera or other device is translated along an axis, referred to herein as the Z-axis and a plurality of image frames is captured at selected positions along the Z-axis. The frames are analyzed to determine a contrast value for such frame and the contrast values for the various frames are processed to determine a point on the Z-axis of maximum contrast from which the focus point can be determined. Methods for making such determinations from raw data are known and may be readily applied in accordance with this invention. It should be understood that there may not be an image for the point of maximum contrast, that point can be calculated from the contrast at other points.

The invention enhances the autofocus process by sequentially or otherwise separately determining maximum contrast positions using a plurality of essentially monochromatic light sources of different colors. The invention provides an improved method of automatically focusing by virtue of the fact that different colors provide slightly different maximum contrast positions which may be combined to calculate a focus position that is more accurate than that produced by conventional white light or other polychromatic methods.

While the invention preferably employs a plurality of monochromatic light sources and a single sensor, those skilled in the art will recognize that an analogous system employing a polychromatic light source and monochromatic sensors could also be used. For example, a polychromatic light source consisting of light emitting diodes of three colors such as red, green, and blue (RGB) and a camera sensitive to the same three colors may be employed. While such a light source might appear white to an observer, it is actually not since the spectrum is limited to the three wavelengths and very little power is produced between those wavelengths. A genuinely white light source could conceivably be employed but the small percentage of power generated in the specific wavelengths to which the camera is responsive would require that the total power of the white light source be a higher than desirable in order to obtain a suitable response in the camera. Typically, light emitting diodes have relatively narrow bandwidths, on the order of 10 to 15 nm and cameras are available that are responsive to the same wavelengths. While red, green, and blue light emitting diodes are commonly available and cameras with similar responses are likewise available, it will be understood that these particular colors are not required by this invention, any combination of illumination sources and similarly responsive cameras may be used. In such a system, the three colors of illumination sources would be energized simultaneously and the camera would be arranged to provide separate outputs at each responsive wavelength. This would both simplify synchronization requirements and allow higher-speed capture of light from the illumination sources and consequently higher speed determination of the point of maximum contrast.

While it is possible to acquire an arbitrarily large number of images as the camera is translated along the Z-axis in autofocus scan path, the point of maximum contrast from which the focus point may be determined can be calculated to a suitable accuracy from a limited number of discrete points along the path. It is not necessary that an image be acquired at the point of maximum contrast in order for that point to be determined.

Moreover, while the present embodiment of the invention describes a system in which a single focus position is determined for an object, the invention may also be employed to determine multiple focus positions corresponding to different locations on the object when the surface of the object contains height variations sufficient to require multiple focus points.

Preferably, in accordance with the invention, the surface is illuminated with top light to permit the camera to determine the peak contrast in the surface during the autofocus sweep. Light emitting diodes are preferably employed as light sources because they are nearly monochromatic and produce a very narrow wave length band of light. Different color LEDs enhance features on the surface of the object because some features appear differently to the camera when using different colors of surface light. It will be understood that the illuminator may include a plurality of LED's of each color.

In accordance with one aspect of this invention, the camera 12 includes imaging optics 13 that relay an image of the surface to the camera's sensor, preferably a pixilated sensor such as a CCD sensor. The optics are designed to focus different colors, that is different wave lengths of light, at different distances from the objective lens. This is sometimes referred to as chromatic aberration, and in many applications is undesirable and is corrected. In accordance with this invention it is used advantageously. Thus, for each color of LED that illuminates the surface, the height where maximum contrast is found during an autofocus sweep is a different absolute height. Because the lens can be designed to focus each wavelength at a different Z-height the Z-height offset for each color is fixed and known for each lens design. These offsets can be precisely determined. It is the combination of this offset and the Z-axis location of the point of maximum contrast that is used to determine the location of the actual maximum contrast point. As the camera moves along the Z-axis in an autofocus sweep, the locations where maximum contrast occurs for each color are different but because the offsets are known, the actual location of the point of maximum contrast can be calculated for each color.

Figure 2:
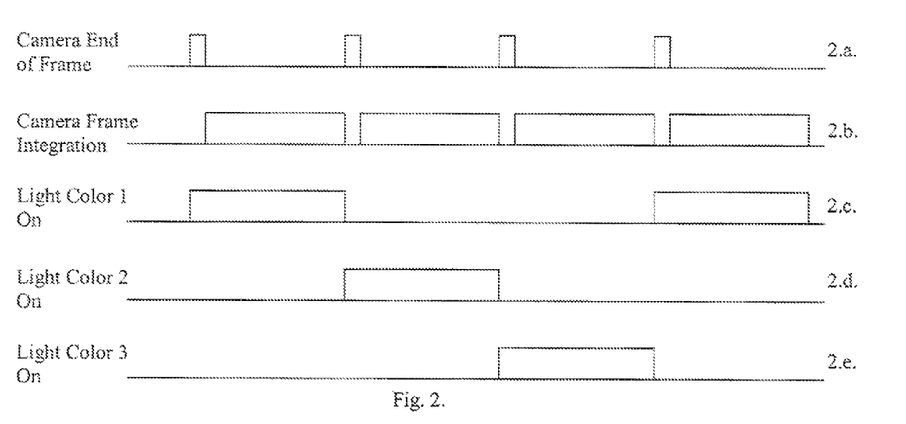
Figure 3:
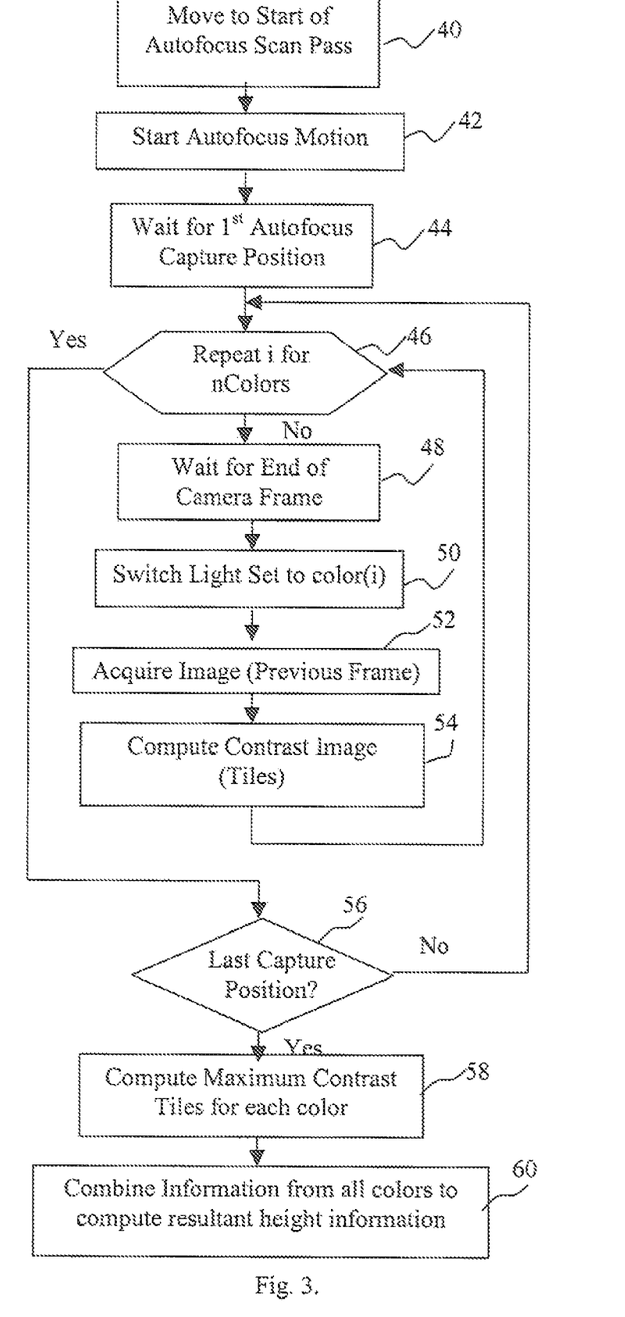
FIG. 3 is a flowchart showing the operation of the invention.

FIG. 2 is a timing diagram and FIG. 3 is a flowchart which together describes the operation of the autofocus system in accordance with this invention.

The process begins at block 40 when the camera is moved to the start of the autofocus scan pass. The autofocus motion, preferably either an upward or a downward motion of the camera along the Z-axis is then initiated at block 42. When the camera reaches a first autofocus capture position at block 44 a counter is checked at 46 to determine whether all of the colors have been used. If not, the process waits for the end of the current camera frame, see FIG. 2a, the light is set to the first color at box 50 and FIG. 2c and an image is acquired at box 52 and FIG. 2b. The contrast values are then computed from the image just acquired at box 54. The process then repeats for each of the plurality of colors as shown in FIGS. 2d and 2e until all of the colors have been used at which point a comparison is made at box 56 to determine whether the last capture position has been reached. If not, the Z-axis position is moved and the portion of the process described in connection with blocks 46, 48, 50, 52 and 54 is repeated until the last capture position has been reached at which point the maximum contrast position for each color is calculated at block 58 and the information from all of the colors is combined to produce a final focus height determination at box 60.

Each color LED Is activated as shown in FIGS. 2c, 2d, and 2e for a time long enough for the camera to gather the required charge as shown in FIG. 2b to determine the intensity gradient. Preferably, three colors, for example red, green, and blue are used but illuminators with only two colors may also be used and provide an improvement over known autofocus apparatus.

Figure 4:
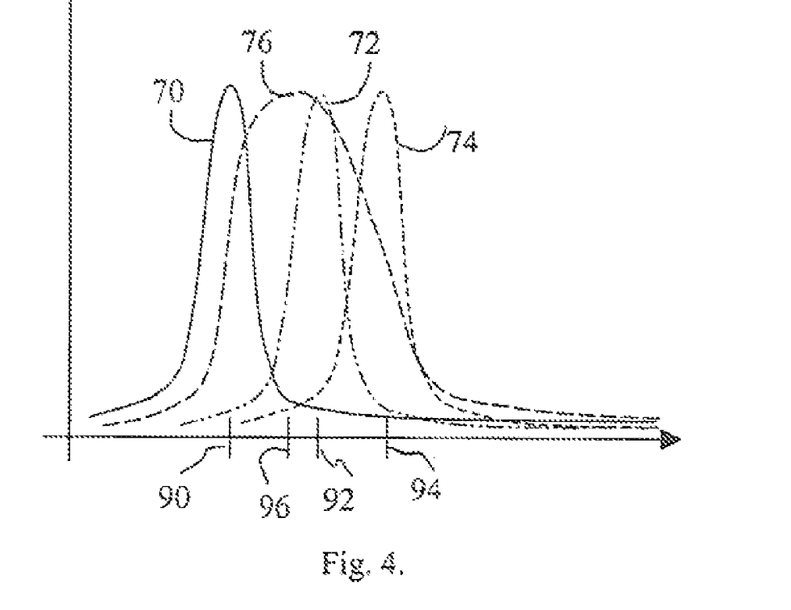
FIG. 4 is a graphical representation of data produced by an autofocus system in accordance with this invention, along with data for a white (non monochromatic) source.

As shown in FIG. 4, each of the colors produces normalized output curves 70, 72 and 74 having contrast peaks at different absolute positions 90, 92 and 94 along the Z-axis. FIG. 4 shows the peaks for red 70 green 72 and blue 74 illumination sources respectively along with a somewhat broader peak produced by a white illumination source 78 for reference. It can be seen that the points of maximum contrast for each color may be determined substantially more precisely by use of multiple monochromatic light sources in accordance with this invention.

Figure 5:
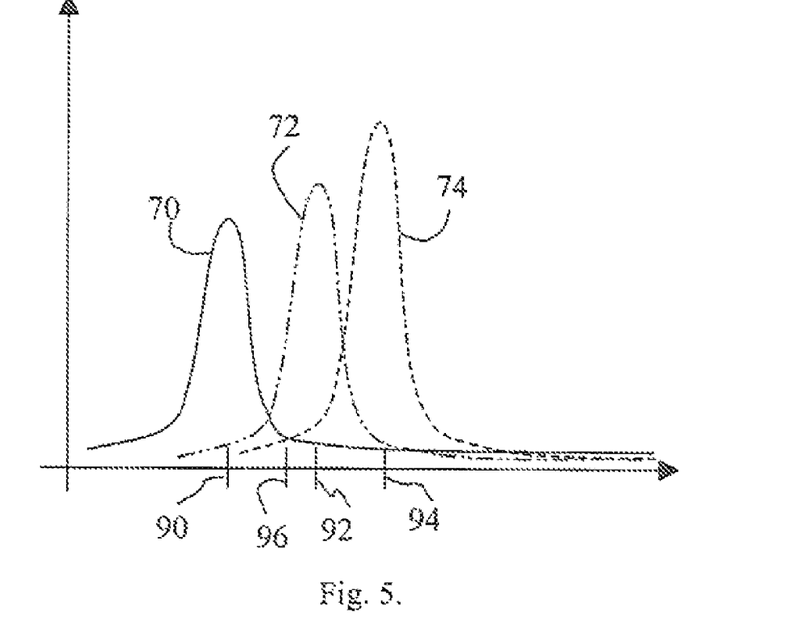
FIG. 5 is a graphical representation of data produced by an autofocus system in accordance with this invention, with non-normalized contrast amplitudes.
Figure 6:
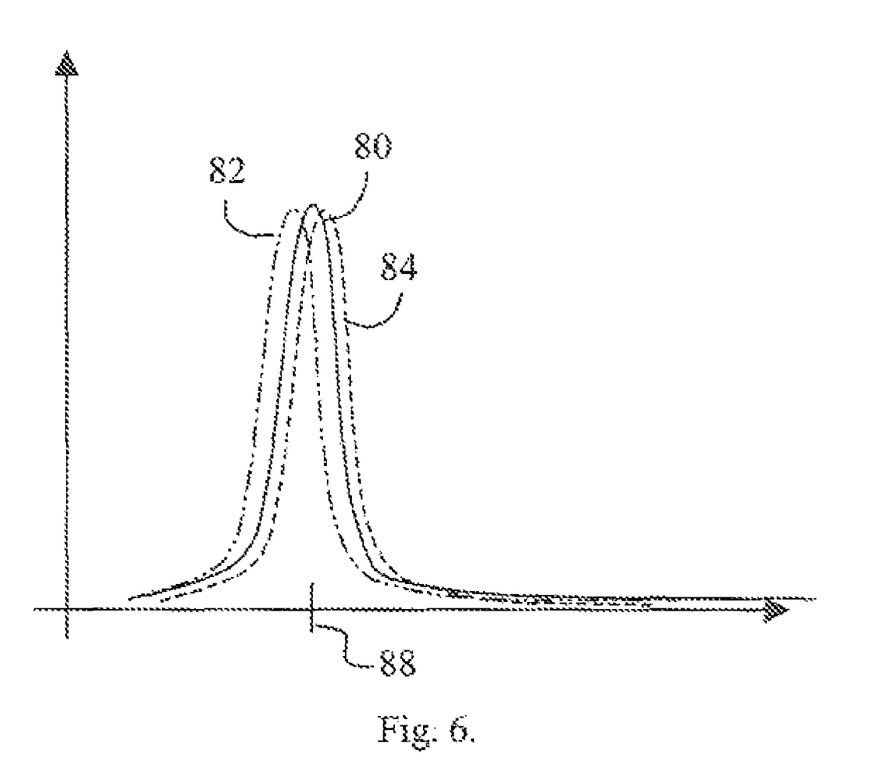
FIG. 6 is a graphical representation of wave length corrected focus peaks normalized In accordance with this invention.

FIG. 5 shows the raw focus curves for the three colors without normalization on a single axis demonstrating the differences in position as well as the differences in amplitude produced in accordance with the invention. FIG. 6 shows the outputs for the red 70, green 72 and blue 74 illuminators.

FIG. 6 shows the same data as in FIG. 4 but with the Z-axis positions corrected for the chromatic aberration of the imaging lens so that only actual the deviation of the peaks from the reference position caused by contrast differences at the different wavelengths is shown. The computed best focus position 88 is shown.

While the invention contemplates acquiring contrast information at a plurality of discrete points along the Z-axis, the Z-axis motion can be continuous or substantially continuous and the color of the illuminators can be changed at each new camera frame of data until the camera has moved far enough along the Z-axis to go through and beyond the position of maximum contrast. This method produces data relatively quickly.

Alternatively, the Z-axis motion can be a stepwise motion starting above or below the position of maximum contrast and the color of the illuminators can be changed so that all colors are used for each step in the Z-axis motion. Movement is continued until the camera has stepped through and beyond the position of maximum contrast. This method also produces data relatively quickly.

The Z-axis motion can be a series of continuous sweeps along the Z-axis each focusing on the same region of interest on the surface, with each sweep using a different color of illumination. This method is easier to implement than the preceding methods because the illumination change does not need to be synchronized with the camera frame capture, each color light can simply be left on during the sweep, but this is somewhat slower.

In accordance with another aspect of the invention, illumination sources producing at least three colors of light are provided together with an objective lens having sufficient chromatic aberration so that the positions of maximum contrast for the three colors of light are displaced from one another by the chromatic aberration of the lens system. In this case, if the depth of field of the optics is selected appropriately, the position of maximum contrast and therefore the appropriate autofocus position can be obtained without moving the camera or the object during image acquisition. In accordance with a further embodiment of the invention the data processor determines an average height based on the wavelength dependant portion and the position dependant portion for the at least two wavelengths and disregards any output signal if the contrast is below a predetermined amount.

In accordance with a still further embodiment of the invention, the data processor determines an average height based on the wavelength dependant portion and the position dependant portion for the at least two wavelengths and disregards any output signal if the intensity of the output signal for one of the wavelengths is below a predetermined magnitude.

Figure 7:
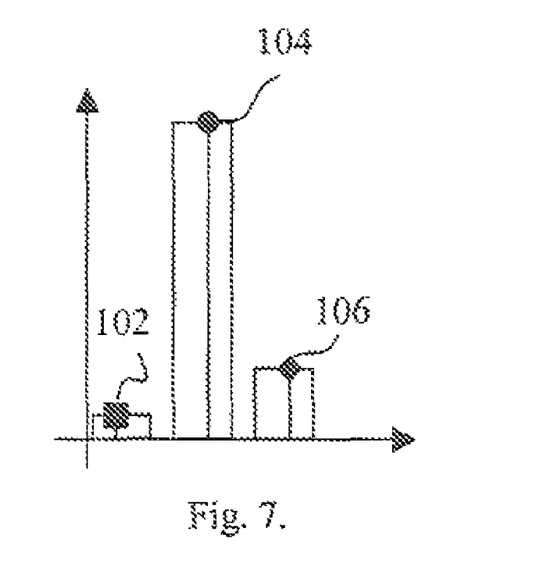
FIG. 7 is a graphical representation of contrast measurements of the three colors all taken at the same single Z-height.
Figure 8:
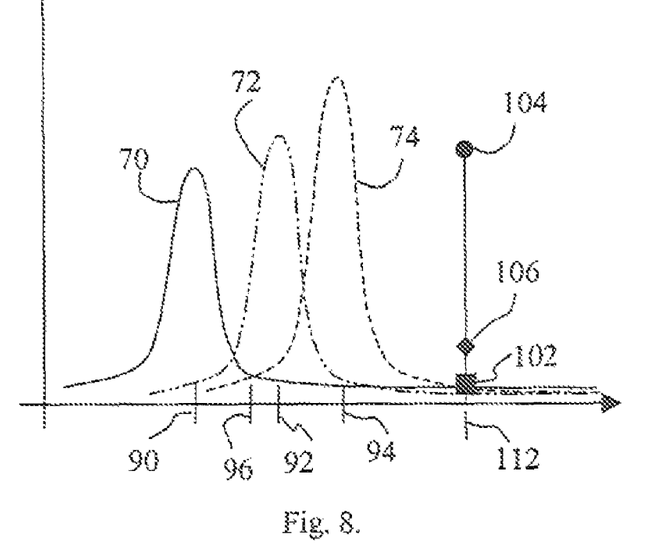
FIG. 8 is a graphical representation of the same three contrast measurements but shown with the previously gathered contrast curves.
Figure 9:
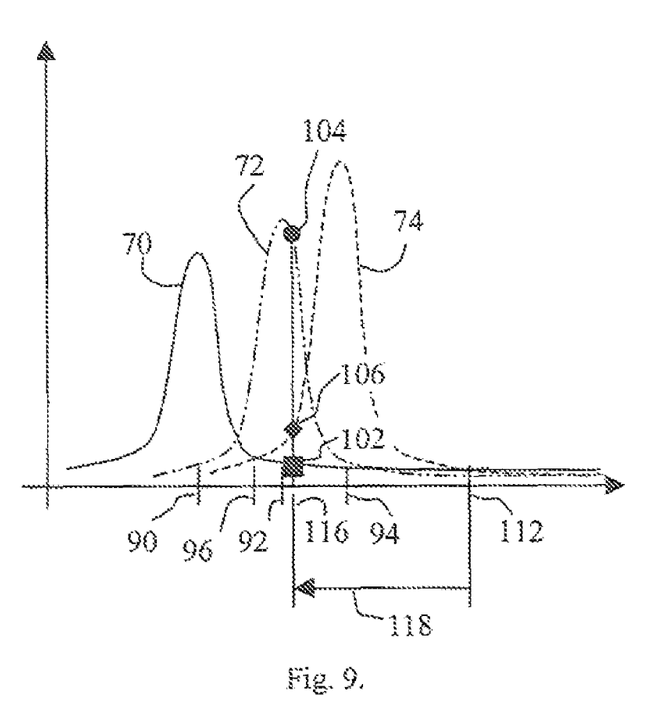
FIG. 9 is a graphical representation of the best fit process that then determines the best focus height.

Finally, in accordance with a variation on the embodiment already described, the Z-axis position can be stationary while the color of the illumination is changed to cause different portions of the region of interest on the surface to be at best focus at a different Z-height for each color as determined by the optical design. The contrast measurements for each of the three colors at the fixed position are represented in FIG. 7 by 102 (red), 104 (green) and 106 (blue). FIG. 8 shows these same contrast measurements represented with the contrast curves previously found in FIG. 5. Z-position 112 represents the single Z-position that the contrast measurements were taken at. Focus curves 70, 72 and 74 represent the nominal focus data as found from FIG. 6. FIG. 9 shows the focus curve displacement found after a best fit is taken to superimpose the contrast values 102, 104 and 106 with the nominal focus curves 70, 72 and 74. Offset distance 118 is the Z-displacement from the position where the images were taken to the position where the best focus position is found. Thus, as long as the single fixed position is sufficiently close to the maximum contrast position the actual maximum contrast position can be determined quickly and without moving the camera.

It should be noted that the relative heights and order of the colors are arbitrarily depicted. The actual displacements of the different colors best focus position are dependent on the optics design and this will not necessarily put them in relative order of wavelength.

In accordance with this method, it is possible for more than one color source to be activated simultaneously by using a color camera so that the position of maximum contrast can be determined separately for each color from a single frame.

Although the invention has been described with reference to the embodiments described above, it will be evident that other embodiments may be alternatively used to achieve the same object. The scope of the invention is therefore not limited to the embodiments described above, but may also be applied to other applications where either focus distance or the height of surface features must be determined.

It should further be noted that the term "comprises/comprising" when used in this specification, including the claims, is taken to specify the presence of stated features, integers, steps or components, but does not exclude the presence or addition of one or more other features, integers, steps, components or groups thereof. It should also be noted that the word "a" or "an" preceding an element in a claim does not exclude the presence of a plurality of such elements. Moreover, any reference signs do not limit the scope of the claims; the invention may be implemented by means of both hardware and software, and several "means" may be represented by the same item of hardware. As used herein the term color is not intended to be limited to visually perceptible colors. Furthermore, the invention resides in each and every novel feature or combination of features.

The invention claimed is:

1. Autofocus apparatus comprising:
   a controllable light source having at least two selectively activated substantially monochromatic output wavelengths for illuminating an object;
   a camera receiving light from said light source reflected from a portion of said object and generating output signals responsive to said received light;
   a controller connected to said camera and said controllable light source for positioning said camera at a first position relative to the object and sequentially illuminating the object with at least two selectively activated substantially monochromatic output wavelengths, changing the position of the camera relative to the object to a second position and sequentially illuminating the object with at least two selectively activated substantially monochromatic output wavelengths; and
   a data processor connected to said camera and receiving said output signals and for each position, comparing the output signals associated with each wavelength and determining a focus parameter from said comparison.

2. The autofocus apparatus of claim 1 in which each output signal comprises a gradient signal which is a function of the focus parameter for that position.

3. The autofocus apparatus of claim 2 in which the output signal for each position comprises a known wavelength dependant portion and a position dependant portion.

4. The autofocus apparatus of claim 3 in which the data processor determines an average height based on the wavelength dependant portion and the position dependant portion for the at least two wavelengths and disregards any output signal when the difference between the wavelength dependant portion and the position dependant portion for the at least two wavelengths is more than a predetermined amount.

5. The autofocus apparatus of claim 1 in which the focus parameter is a height parameter.

6. The autofocus apparatus of claim 5 in which the data processor determines an average height based on the wavelength dependant portion and the position dependant portion for the at least two wavelengths.

7. The autofocus apparatus of claim 5 in which the data processor determines a weighted average height based on the wavelength dependant portion and the position dependant portion for the at least two wavelengths.

8. The autofocus apparatus of claim 1 in which the data processor determines an average height based on the wavelength dependant portion and the position dependant portion for the at least two wavelengths and disregards any output signal when the contrast is below a predetermined amount.

9. The autofocus apparatus of claim 1 in which the data processor determines an average height based on the wavelength dependant portion and the position dependant portion for the at least two wavelengths and disregards any output signal when the intensity of the output signal for one of the wavelengths is below a predetermined magnitude.

10. A method for determining the height of a surface feature on an object comprising:
    sequentially illuminating a portion of the object including the surface feature with at least two selectively activated substantially monochromatic output wavelengths;
    detecting light reflected from said object at each of the at least two selectively activated substantially monochromatic output wavelengths at two different distances from the object;
    for each wavelength, determining the Z-distance between peaks at the two different distances from the object;
    determining the height of surface features from differences in the Z-distance between peaks for the at least two output wavelengths.

11. A method for automatically determining a focus distance for an object comprising:
    separately determining a maximum contrast distance using at least two different wavelengths of light by illuminating the object with a first wavelength of light, determining a maximum contrast distance for the first wavelength, illuminating the object with a second wavelength of light and determining the maximum contrast distance for the second wavelength; and
    determining the focus distance from the separately determined maximum contrast distances.

12. The method for automatically determining a focus distance for an object of claim 11 comprising separately determining a maximum contrast distance using at least three different wavelengths of light and discarding one maximum contrast distance that exceeds a predetermined maximum variation from the other two maximum contrast distances.

13. The method for automatically determining a focus distance for an object of claim 11 comprising focusing the at least two different wavelengths at two different focal planes.

14. The method for automatically determining a focus distance for an object of claim 13 comprising acquiring contrast information for each wavelength, and correcting the information for the two different focal planes.

15. The method for automatically determining a focus distance for an object of claim 13 in which the step of determining a maximum contrast distance for each wavelength comprises collecting data for each wavelength and normalizing the data to compensate for the different wavelengths.

16. The method for automatically determining a focus distance for an object of claim 11 in which the step of separately determining a maximum contrast distance using at least two different wavelengths of light comprises collecting contrast data for each of the at least two different wavelengths of light at a plurality of contrast distances from the object.

17. The method for automatically determining a focus distance for an object of claim 16 in which the collecting step comprises moving to a first distance, collecting data for all of the different wavelengths at that distance, moving to a second distance and repeating the collecting step for all of the different wavelengths at that distance.

18. Autofocus apparatus comprising:
a controllable polychromatic light source having at least two output wavelengths adapted for illuminating an object;
a color camera receiving light from said light source reflected from a portion of said object and generating separate output signals at the at least two wavelengths responsive to said received light;
a controller connected to said camera and said controllable light source for positioning said camera at a first position relative to the object and illuminating the object with at the least two output wavelengths and acquiring separate output signals from the camera for each of the two wavelengths, changing the position of the camera relative to the object to a second position and illuminating the object with the at least two output wavelengths and acquiring separate output signals from the camera for each of the two wavelengths; and
a data processor connected to said camera and receiving said output signals and for each position, comparing the output signals associated with each wavelength and determining a focus parameter from said comparison.

19. The distance measuring apparatus of claim 18 in which the step of determining the distance parameter comprises matching the output signals to a known focus distance relationship.

20. The distance measuring apparatus of claim 18 in which the output signals are contrast signals.

21. The distance measuring apparatus of claim 18 in which the controllable polychromatic light source has at least three output wavelengths.

22. The distance measuring apparatus of claim 18 in which the lightsource emits the at least two wavelengths simultaneously, and the camera is a color camera.

23. Autofocus apparatus comprising:
a controllable light source having at least three selectively activated substantially monochromatic output wavelengths for illuminating an object;
a camera receiving light from said light source reflected from a portion of said object and generating output signals responsive to said received light of the camera including an objective alliance having sufficient chromatic aberration that the light from the at least three selectively activated substantially monochromatic light sources is focused at three points along the axis separated from one another;
a controller connected to said camera and said controllable light source for positioning said camera at a first position relative to the object and sequentially illuminating the object with each of the at least three selectively activated substantially monochromatic output wavelengths, and producing three output signals, one corresponding to each wavelength, each output signal representing the displacement of the point of maximum contrast from the three points along the Z-axis for the three wavelengths;
a data processor connected to said camera and receiving said output signals and for each position, comparing the output signals associated with each wavelength and determining a focus parameter from said comparison.

24. Apparatus for determining a focus position for an object in a machine vision system comprising:
a camera having imaging optics characterized by a known chromatic aberration at least two wavelengths and positioned at a known distance from the object;
an illumination source producing substantially monochromatic illumination at said two wavelengths;
a controller for selectively separately illuminating an object with light from said illumination source at each of the two wavelengths;
a detector associated with the camera responsive to light reflected from the object and passing through the imaging optics at said two wavelengths for producing first and second contrast signals in response to said separate illumination;
a processor responsive to the first and second contrast signals for determining an actual position of maximum contrast by comparing the first and second contrast signals to a predetermined relation between relative position and contrast and applying the comparison to the known position.

25. The apparatus of claim 24 in which the processor adjusts the first and second output signals to compensate for the chromatic aberration of the imaging optics.

26. The apparatus of claim 24 in which the illumination source produces substantially monochromatic illumination at least three wavelengths.

27. Apparatus for determining the location of an object in a machine vision system comprising:
a camera having imaging optics characterized by a known chromatic aberration at least two wavelengths and positioned at a known distance from the object;
an illumination source producing substantially monochromatic illumination at said two wavelengths;
a controller for selectively separately illuminating an object with light from said illumination source at each of the two wavelengths;
a detector associated with the camera responsive to light reflected from the object and passing through the imaging optics at said two wavelengths for producing first and second contrast signals in response to said separate illumination;
a processor responsive to the first and second contrast signals for determining the actual position of the object by comparing the first and second contrast signals to a predetermined relation between relative position and contrast and applying the comparison to the known position.

* * * * *

UNITED STATES PATENT AND TRADEMARK OFFICE
CERTIFICATE OF CORRECTION

PATENT NO. : 7,812,971 B2  Page 1 of 1
APPLICATION NO. : 11/770187
DATED : October 12, 2010
INVENTOR(S) : Robert L. Jackson and Edward T. Polidor It is certified that error appears in the above-identified patent and that said Letters Patent is hereby corrected as shown below:

In column 10, line 40,
after "aberration at" insert --at--.

Signed and Sealed this

Thirtieth Day of November, 2010

David J. Kappos
*Director of the United States Patent and Trademark Office*